US012650993B2

(12) United States Patent
Gong et al.

(10) Patent No.: US 12,650,993 B2
(45) Date of Patent: Jun. 9, 2026

(54) DATA ASSET REUTILLIZATION ENGINE FOR ENHANCING LLM AGENT-BASED DATA SYSTEMS

(71) Applicant: Dell Products L.P., Round Rock, TX (US)

(72) Inventors: Min Gong, Shanghai (CN); Qicheng Qiu, Shanghai (CN); Zijia Wang, London (GB)

(73) Assignee: Dell Products L.P., Round Rock, TX (US)

( * ) Notice: Subject to any disclaimer, the term of this patent is extended or adjusted under 35 U.S.C. 154(b) by 5 days.

(21) Appl. No.: 18/925,719

(22) Filed: Oct. 24, 2024

(65) Prior Publication Data

US 2026/0119507 A1 Apr. 30, 2026

(51) Int. Cl.
*G06F 16/2457* (2019.01)
*G06F 16/22* (2019.01)
*G06F 16/2452* (2019.01)

(52) U.S. Cl.
CPC .... *G06F 16/24575* (2019.01); *G06F 16/2237* (2019.01); *G06F 16/24522* (2019.01)

(58) Field of Classification Search
CPC ........... G06F 16/24575; G06F 16/2237; G06F 16/24522
See application file for complete search history.

(56) References Cited

U.S. PATENT DOCUMENTS 12,242,468 B1 * 3/2025 Brenner ................ G06F 16/242
12,450,217 B1 * 10/2025 Godbole ................ G06F 40/40
2019/0114327 A1 * 4/2019 Yeh ................... G06F 16/24522
2025/0217341 A1 * 7/2025 Titus ................... G06F 16/2237

FOREIGN PATENT DOCUMENTS

CN 118093634 A * 5/2024 ......... G06F 16/2282

OTHER PUBLICATIONS

Gu, Few-shot Text-to-SQL Translation using Structure and Content Prompt Learning, pp. 147:2-28, Jun. 2023.*
Dale, Handbook of Natural Language Processing, pp. 215-248 (Year: 2000).*

* cited by examiner

*Primary Examiner* — Albert M Phillips, III
(74) *Attorney, Agent, or Firm* — Chamberlain, Hrdlicka, White, Williams & Aughtry; Aly Z. Dossa

(57) ABSTRACT

A method for generating a query response using a data asset reutilization engine includes receiving a first user query from a user via a client, extracting contextual metadata from the first user query, and embedding the contextual metadata as a first contextual vector. In addition, the method includes making a first determination, using a vector database and the first contextual vector, that a first data asset matches the first user query. Finally, the method includes, obtaining, in response to the first determination, the first data asset, generating a first response based on the first data asset, and causing to display the first response to the user.

19 Claims, 6 Drawing Sheets

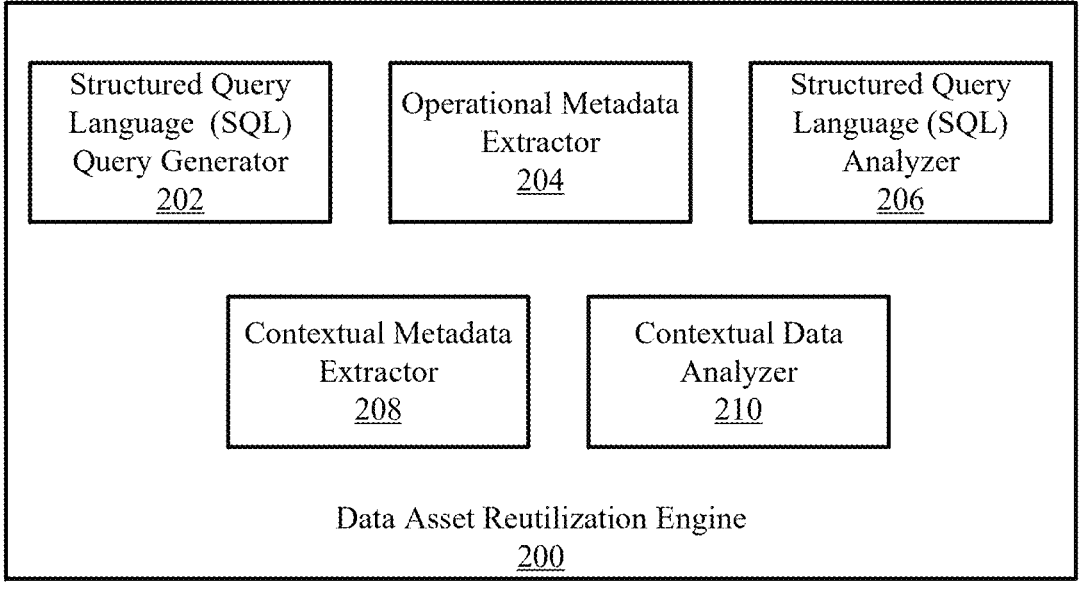
FIG. 2.1
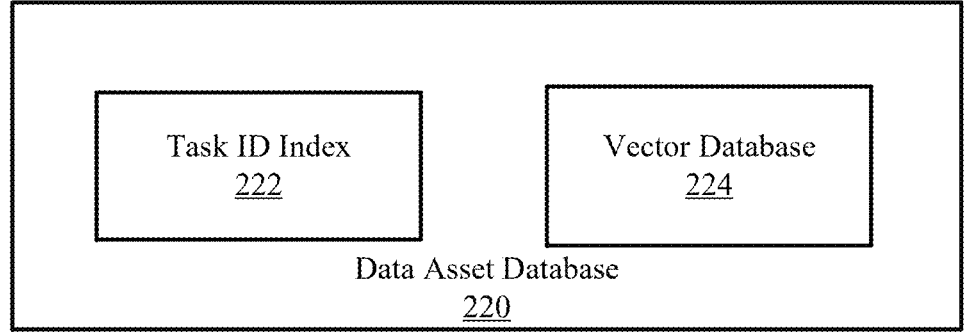
FIG. 2.2

600

DATA ASSET REUTILLIZATION ENGINE FOR ENHANCING LLM AGENT-BASED DATA SYSTEMS

BACKGROUND

Users often use natural language queries to obtain answers to questions from computing systems. However, obtaining useful responses from natural language queries can be a time and resource-intensive process.

BRIEF DESCRIPTION OF DRAWINGS

FIG. 2.1 shows a diagram of a data asset reutilization engine in accordance with one or more embodiments of the disclosure.

FIG. 2.2 shows a diagram of a data asset database in accordance with one or more embodiments of the disclosure.

DETAILED DESCRIPTION

In modern enterprises, data systems play a crucial role in transforming raw data into actionable insights. These systems are often complex, including multiple layers such as storage, data management, and data products. Despite advancements in data management technologies, significant manual effort is still required to manage, transform, and utilize data effectively. Every day an immense amount of data assets are abstained from querying systems such as large language models (LLMs). One of the key challenges in data systems is the efficient reuse and sharing of data assets to avoid duplication of efforts. To address this issue, existing systems leverage preexisting data assets to fulfill user queries by comparing metadata from the user queries with that of the preexisting data assets to obtain a pre-existing data asset relevant to the user query. However, existing systems struggle to provide this functionality when presented with natural language queries, which are becoming more common due to the emergence of LLMs. As such, a solution is needed that can utilize pre-existing data assets to fulfill natural language queries.

As a result of the limitations of current systems discussed above, embodiments of the disclosure are directed to systems and methods that can obtain contextual information from natural language queries to determine if there are relevant preexisting data assets within a data system and then use the preexisting data assets to provide functionality as described herein.

Specific embodiments will now be described with reference to the accompanying figures.

Figure 1:
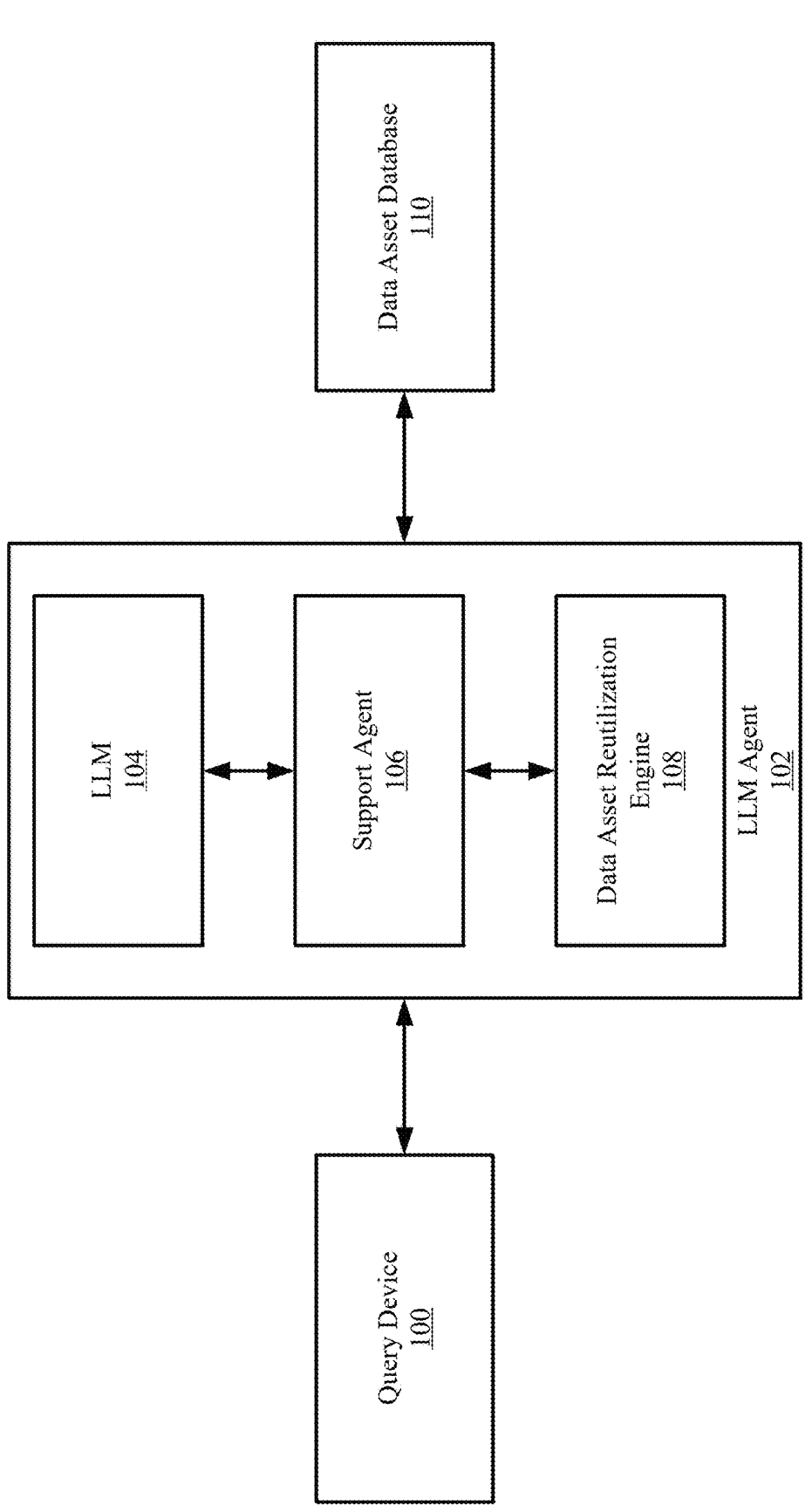
FIG. 1 shows a diagram of a system in accordance with one or more embodiments of the disclosure.

FIG. 1 shows a system in accordance with one or more embodiments. The system may include a query device (100), a large language model (LLM) agent (102), a LLM (104), a support agent (106), a data asset reutilization engine (108), and a data asset database (110). The system may include additional, fewer, and/or different components without departing from the scope of the embodiments disclosed herein. Each component may be operably/operatively connected to any of the other components via any combination of wired and/or wireless connections. Each of these system components is described below.

Though not shown in FIG. 1, the query device (100), the LLM agent (102), and the data asset database (110) may be operatively connected through a wired and/or wireless network (e.g., a local area network (LAN), a wide area network (WAN) such as the Internet, a mobile network, any other network type, or a combination thereof). Further, the network may encompass various interconnected, network-enabled subcomponents (or systems) (e.g., switches, routers, gateways, etc.) that may facilitate communications between the aforementioned components. Moreover, the query device (100), the LLM agent (102), and the data asset database (110) may communicate with one another using any combination of wired and/or wireless communication protocols.

In one or more embodiments, the query device (100), the LLM agent (102) and the data asset database (110) may be located on a single physical and/or logical computing system.

In one or more embodiments, the query device (100) may include functionality to receive user inputs including any structured and/or unstructured data (e.g., audio, video, text, etc.) from the user; receive responses; provide the responses to the LLM agent (102); receive feedback (e.g., additional user inputs reflecting whether the responses properly addressed the user inputs); and provide responses for the user query to the user (e.g., via a graphical user interface (GUI)). In one or more embodiments, the query device (100) may take the form of a chatbot or a similar interface. Further, the query device (100) includes functionality to perform at least a portion of the methods shown in FIGS. 3-5. One of ordinary skill in the art will appreciate that the query device (100) may perform other functionalities without departing from the scope of the embodiments disclosed herein.

In one or more embodiments disclosed herein, the query device (100) may be a physical device (see e.g., FIG. 6) such as a laptop, a cell phone, a tablet computer, a server, etc. In another embodiment of the disclosure, the query device (100) may be implemented on a virtual device (e.g., a virtual machine executing on one or more physical devices).

In one or more embodiments, the LLM agent (102) may include functionality to utilize the LLM (104), the support agent (106), and the data asset reutilization engine (108) to process structured and/or unstructured user inputs (e.g., natural language queries) and generate corresponding outputs using data assets (e.g., files, folder, tables, etc.) within the data asset database (110). Further, the LLM agent (102) may include functionality to perform at least a portion of the methods shown in FIGS. 3-5. One of ordinary skill in the art in the art will appreciate that the LLM agent (102) may perform other functionalities without departing from the scope of the embodiments disclosed herein.

In one or more embodiments, the LLM (104) may include functionality to process user inputs (e.g., natural language queries), recognize patterns, and generate contextually relevant natural language results. Further, the LLM (104) may include functionality to determine the intent behind user queries. In one or more embodiments, the LLM (104) is retrieval augmented generation (RAG)-based to engage in discussions with users to generate more comprehensive results. Further, the LLM (104) may include functionality to perform at least a portion of the methods shown in FIGS. 3-5. One of ordinary skill in the art will appreciate that the LLM (104) may perform other functionalities without departing from the scope of the embodiment disclosed herein.

In one or more embodiments, the support agent (106) may include functionality to perform auxiliary tasks to improve the overall performance of the LLM agent (102). In one or more embodiments, auxiliary tasks may include but should not be limited to preprocessing (e.g., labeling, normalizing, etc.), data retrieval (i.e., querying databases), post-processing (e.g., analyzing, transforming, filtering, etc.), etc. In one or more embodiments, the support agent (106) may include functionality to process natural language results in multiple languages (e.g., English, Spanish, Hindi, etc.). In one or more embodiments, the support agent (106) may include functionality to decompose user queries into atomic tasks (i.e., splitting the user query into singular tasks). Further, the support agent (106) may include functionality to perform at least a portion of the methods shown in FIGS. 3-5. One of ordinary skill in the art will appreciate that the support agent (106) may perform other functionalities without departing from the scope of the embodiments disclosed herein.

In one or more embodiments, the data asset reutilization engine (108) may include functionality to identify existing data assets within the data asset database (110) relevant to a user query. In one or more embodiments, the data asset reutilization engine (108) may include the functionality to extract operational metadata (e.g., data sources, executable SQL queries, etc.) and contextual metadata (e.g., artificial intelligence (AI) chat logs used to create data assets, the data asset description, etc.) from preexisting data assets and user queries as described below in FIG. 3-5. In one or more embodiments, time and computing resources (e.g., processing, communication, storage, etc.) have already been expended processing and retrieving the data assets in the data asset database (110) thus, reusing them will increase efficiency and reduce resource usage. Further, the data asset reutilization engine (108) may include functionality to perform at least a portion of the methods shown in FIGS. 3-5. One of ordinary skill in the art will appreciate that the data asset reutilization engine (108) may perform other functionalities without departing from the scope of the embodiments disclosed herein.

In one or more embodiments, the data asset database (110) may include functionality to store data (e.g., data assets). The data asset database (110) may utilize volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory. In one or more embodiments, the data asset database (110) may encrypt the data that it stores. Further, the data asset database (110) may include functionality to perform at least a portion of the method shown in FIG. 3-5. One of ordinary skill in the art will appreciate that the data asset database (110) may perform other functionalities without departing from the scope of the embodiments disclosed herein.

In one or more embodiments, the query device (100), the LLM agent (102) and/or the data asset database (110) is implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The query device (100), the LLM agent (102), and/or the data asset database (110) may be implemented using other types of computing devices without departing from the embodiments disclosed herein. For additional details regarding computing devices, refer to FIG. 6. Further, in one or more embodiments, the data asset database (110) is located on any combination of the query device (100), the LLM agent (102), and any other location.

In one or more embodiments, the query device (100), the LLM agent (102) and/or the data asset database (110) is implemented using a logical device without departing from the embodiments disclosed herein. For example, the query device (100), the LLM agent (102), and/or the data asset database (110) may include virtual machines that utilize computing resources of any number of physical computing devices to provide the functionality of the query device (100), the LLM agent (102) and/or the data asset database (110). The query device (100), the LLM agent (102), and/or the data asset database (110) may be implemented using other types of logical devices without departing from the embodiments disclosed herein.

Turning to FIG. 2.1, FIG. 2.1 shows a diagram of a data asset reutilization engine (200), which may be the same data asset reutilization engine (e.g., 108 in FIG. 1) discussed above. More specifically, in one or more embodiments, the data asset reutilization engine (200) includes a structured query language (SQL) query generator (202), an operational metadata extractor (204), a SQL analyzer (206), a contextual metadata extractor (208) and a contextual data analyzer (210). In one or more embodiments, the aforementioned components may be operably/operatively connected to any of the other aforementioned components via any combination of wired and/or wireless connections.

In one or more embodiments, the SQL query generator (202) may include functionality to convert an unstructured query (e.g., a user query reciting, "retrieve sales data from Q4") into a SQL query form (i.e., machine-readable code (e.g., SELECT*FROM sales_data WHERE quarter='Q4')). Further, the SQL query generator (202) may include functionality to perform at least a portion of the methods shown in FIGS. 3-5. One of ordinary skill in the art will appreciate that the SQL query generator (202) may perform other functionalities without departing from the scope of the disclosure.

In one or more embodiments, the operational metadata extractor (204) includes functionality to extract operational metadata from SQL queries and data assets. In one or more embodiments, generation and execution of SQL queries (e.g., using the SQL analyzer (206) as discussed herein) generates metadata, which the operational metadata extractor (204) is able to gather and organize in accordance with embodiments disclosed herein. In one or more embodiments, the operational metadata includes information usable to retrieve a data asset and information linking the data asset to a SQL query. As such, the operational metadata may include a portion or the entirety of a SQL query used to retrieve the data asset, the location that the data asset was retrieved from (e.g., a file path at which the data asset is located, an identifier indicating a portion of a file, etc.), information about any processing done to the data asset (e.g., filtering, normalization, encryption, etc.), date and/or time of creation of the data asset, size of the data asset (e.g., 5 gigabytes), etc. In one or more embodiments, the operational metadata extractor (204) also includes the functionality to assign task identifiers (IDs) to SQL queries and the data assets. In one or more embodiments, a task ID includes any identifier or other notation methodology (e.g., a unique string of characters and/or cryptographic variables) to uniquely identify a larger set of data, such as the operational metadata associated with a data asset. In one or more embodiments, the operational metadata extractor (204) stores task IDs associated with data assets in a storage, such as a task ID index, to enable searching of the task IDs. Further, the operational metadata extractor (204) may include functionality to perform at least a portion of the methods shown in FIGS. 3-5. One of ordinary skill in the art will appreciate that the operational metadata extractor (204) may perform other functionalities without departing from the scope of the disclosure.

In one or more embodiments, the SQL analyzer (206) may include functionality to find and retrieve data assets from a data asset database (e.g., 110 in FIG. 1) related to a SQL query. Further, the SQL analyzer (206) may include the functionality to determine the similarity between the SQL query's task ID and the data asset's task IDs. Further, the SQL analyzer (206) may include functionality to perform at least a portion of the methods shown in FIGS. 3-5. One of ordinary skill in the art will appreciate that the SQL analyzer (206) may perform other functionalities without departing from the scope of the disclosure.

In one or more embodiments, the contextual metadata extractor (208) includes functionality to extract contextual metadata from data assets and unstructured queries (e.g., a natural language user query). The contextual metadata extractor (208) extracts contextual metadata by any means known in the art. In one or more embodiments, the contextual metadata includes creation descriptions and AI conversation logs. In one or more embodiments, the creation descriptions include natural language descriptions of the data asset provided at the time of the data asset's creation and/or retrieval (e.g., this data asset includes sales data for . . . ). In one or more embodiments, AI conversation logs include the natural language user request and natural language conversation between a human and an LLM agent (e.g., 102 in FIG. 1) used to obtain or create the data asset. It should be further appreciated, that the AI conversation logs may only be available if the data asset was created or retrieved using an LLM. Further, the contextual metadata extractor (208) may include functionality to perform at least a portion of the methods shown in FIGS. 3-5. One of ordinary skill in the art will appreciate that the contextual metadata extractor (208) may perform other functionalities without departing from the scope of the disclosure.

In one or more embodiments, the contextual data analyzer (210) includes the functionality to identify data assets from the data asset database (e.g., 110 in FIG. 1) similar to the contextual metadata from the natural language query. In one or more embodiments, the contextual data analyzer (210) identifies similar data assets by any means known in the art. Further, in one or more embodiments, the contextual data analyzer (210) includes the functionality to embed contextual metadata and/or operational metadata in contextual vectors. Further, the contextual data analyzer (210) may include functionality to perform at least a portion of the methods shown in FIGS. 3-5. One of ordinary skill in the art will appreciate that the contextual data analyzer (210) may perform other functionalities without departing from the scope of the disclosure.

Turning to FIG. 2.2, FIG. 2.2 shows a diagram of a data asset database (220), which may be the same as the data asset database (e.g., 110 in FIG. 1) discussed above. More specifically, in one or more embodiments, the data asset database (220) includes a task ID index (222) and a vector database (224). In one or more embodiments, the aforementioned components may be operably/operatively connected to any of the other aforementioned components via any combination of wired and/or wireless connections.

In one or more embodiments, the task ID index (222) includes functionality to store task IDs. In one or more embodiments, each task ID is associated with a data asset. In one or more embodiments, each task ID is associated with a data asset in the data asset database (220). The task ID index (222) may utilize volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory. In one or more embodiments, the task ID index (222) may encrypt the data that it stores. Further, the task ID index (222) includes functionality to perform at least a portion of the method shown in FIG. 3-5. One of ordinary skill in the art will appreciate that the task ID index (222) may perform other functionalities without departing from the scope of the embodiments disclosed herein.

In one or more embodiments, the vector database (224) includes the functionality to store contextual vectors. In one or more embodiments, the contextual vector refers to a numerical repression of the data asset that captures the meaning and/or characteristics of the data asset within a specific context. In one or more embodiments, each contextual vector is associated with a data asset in the data asset database (220). The vector database (224) may utilize volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory. In one or more embodiments, the vector database (224) encrypts the data that it stores. Further, the vector database (224) includes functionality to perform at least a portion of the method shown in FIG. 3-5. One of ordinary skill in the art will appreciate that the vector database (224) may perform other functionalities without departing from the scope of the embodiments disclosed herein.

Figure 3:
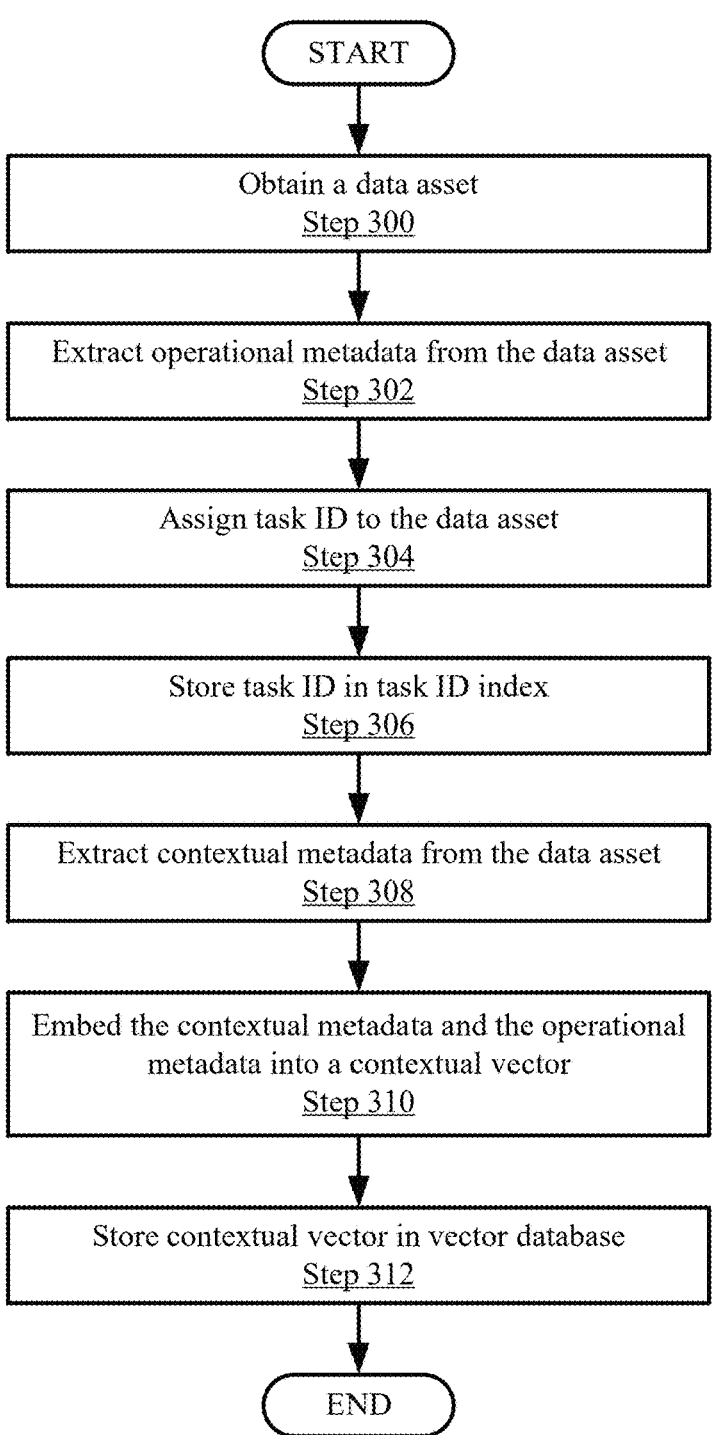
FIG. 3 shows a flowchart of a method for extracting contextual and operational metadata from data assets in accordance with one or more embodiments of the disclosure.

Turning to FIG. 3, FIG. 3 shows a flowchart of a method for extracting and storing contextual and operational metadata from data assets in accordance with one or more embodiments disclosed herein. The method may be performed by, for example, an LLM agent (e.g., 102 in FIG. 1). Other components in the system may perform this method without departing from the scope of the disclosure.

While the various steps in the flowchart are shown in FIG. 3 are presented and described sequentially, one of ordinary skill in the art in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 3 may be performed concurrently with one or more steps in FIGS. 4-5.

In step 300, a data asset reutilization engine (e.g., 108 in FIG. 1) obtains a data asset from a data asset database (e.g., 110 in FIG. 1). In one or more embodiments, the data asset originates from any source including but not limited to, a previous user query, a pre-populated database, etc.

In step 302, operational metadata is extracted from the data asset using an operational metadata extractor (e.g., 204 in FIG. 2.1). In one or more embodiments, the operational metadata extractor (e.g., 204 in FIG. 2.1) extracts metadata as described above.

In step 304, a task ID is assigned to the data asset using the operational metadata extractor (e.g., 204 in FIG. 2.1). In one or more embodiments, a task ID includes include any identifier or other notation methodology (e.g., a unique string of characters and/or cryptographic variables) to uniquely identify a larger set of data, such as the operational metadata associated with a data asset. In one or more embodiments, each data asset in the data asset database (e.g., 110 in FIG. 1) has a unique task ID assigned to it. In one or more embodiments, the task IDs will make the data assets easily identifiable by a SQL analyzer (e.g., 206 in FIG. 2.1) when matching the data assets to user queries as described below in FIG. 5.

In step 306, the task ID is stored in the task ID index (e.g., 222 in FIG. 2.2) using the SQL analyzer (e.g., 206 in FIG. 2.1). In one or more embodiments, the task IDs may be stored in the task ID index (e.g., 222 in FIG. 2.2) by any means know in the art including sequentially, hierarchically, by unique identifiers, size of the associated asset, etc.

In step 308, contextual metadata is extracted from the data asset using a contextual metadata extractor (e.g., 208 in FIG. 2.1). In one or more embodiments, the contextual metadata extractor (e.g., 208 in FIG. 2.1) extracts metadata by any means known in the art. In one or more embodiments, the contextual metadata includes creation descriptions and AI conversation logs. In one or more embodiments, the creation descriptions include natural language descriptions of the data asset provided at the time of the data asset's creation (e.g., this data asset includes sales data for . . . ). In one or more embodiments, AI conversation logs include the natural language user request and natural language conversation between a human and LLM used to obtain or create the data asset. In one or more embodiments, the AI conversation logs are only available if the data asset was created or retrieved using an LLM.

In step 310, the contextual metadata and operational metadata are summarized into a text description and embedded as a contextual vector using a contextual data analyzer (e.g., 210 in FIG. 2.1). In one or more embodiments, the text description will be used for data asset retrieval as described in FIG. 5. In one or more embodiments, the text description may be natural language text. In a non-limiting example, the text description may recite, "This data asset contains sales data for the last quarter, sourced from SALES_DATA database." In one or more embodiments, the contextual vector may refer to a numerical repression of the data asset that captures the meaning and/or characteristics of the text description. In one or more embodiments, the operational metadata is not a requirement for creating the contextual vector and may only be needed if the contextual metadata is insufficient as described below in FIG. 5.

In step 312, the contextual data analyzer (e.g., 210 in FIG. 2.1) stores the contextual vector in a vector database (e.g., 224 in FIG. 2.2). In one or more embodiments, the contextual vectors may be stored in the vector database (e.g., 224 in FIG. 2.2) by any mean know in the art including but not limited to, sequentially, hierarchically, by unique identifiers, size of the associated asset, by context, etc.

In one or more embodiments, the method may end following step 312.

Figure 4:
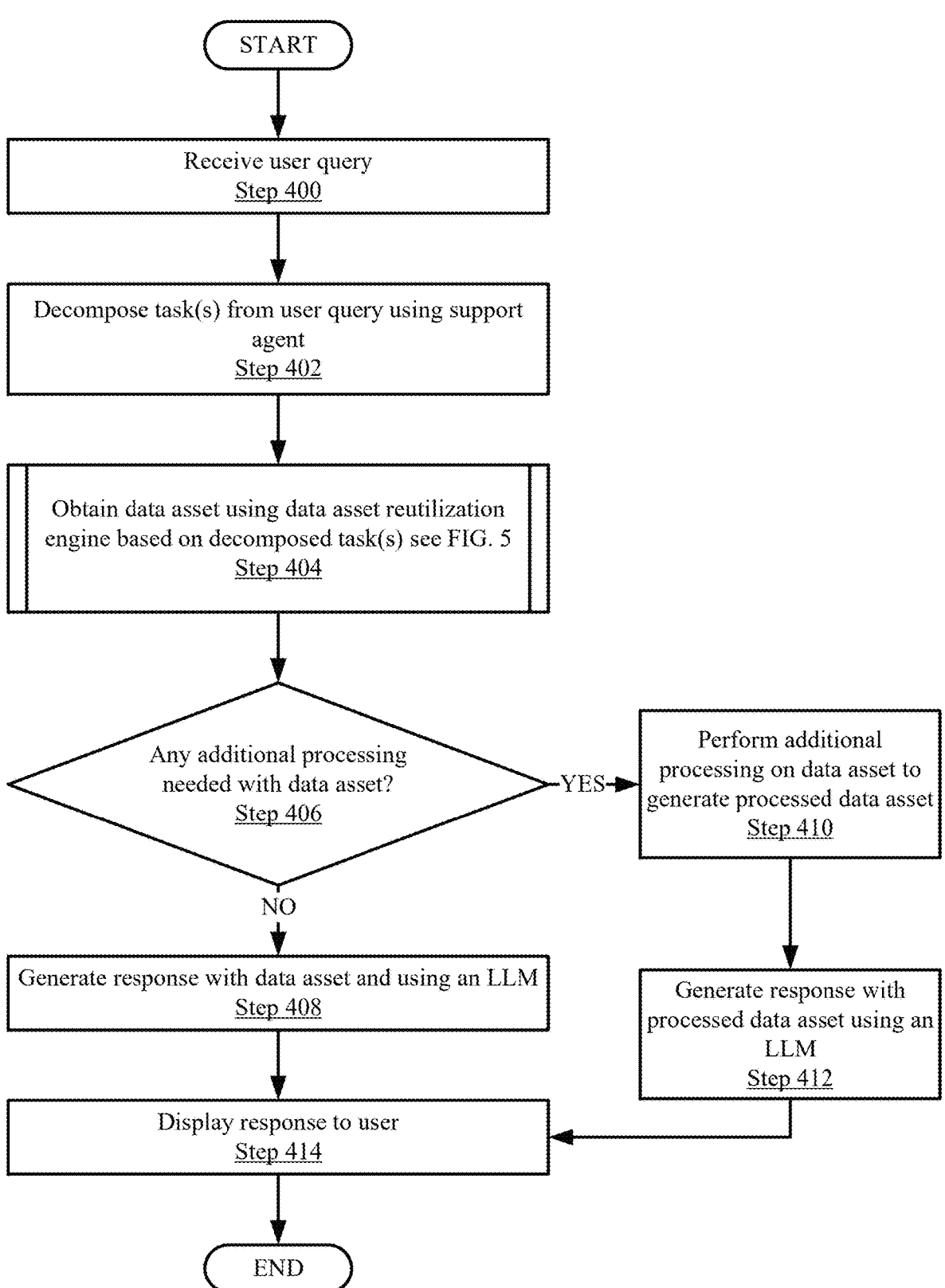
FIG. 4 shows a flowchart of a method for generating a response to a user query in accordance with one or more embodiments of the disclosure.

Turning to FIG. 4, FIG. 4 shows a flowchart of a method for generating a response to a user query in accordance with one or more embodiments disclosed herein. The method may be performed by, for example, an LLM agent (e.g., 102 in FIG. 1). Other components in the system may perform this method without departing from the disclosure.

While the various steps in the flowchart shown in FIG. 4 are presented and described sequentially, one of ordinary skill in the art in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4 may be performed concurrently with one or more steps in FIG. 3 or 5.

In step 400, a query device (e.g., 100 in FIG. 1) receives a user query. In one or more embodiments, the user query may be in structured (e.g., SQL form) or unstructured form (e.g., a natural language query). In one or more embodiments, a user may send the user query to the query device (e.g., 100 in FIG. 1) by any means known in the art, including but not limited to using a graphical user interface (GUI) (not shown).

In step 402, a support agent (e.g., 106 in FIG. 1) decomposes the user query into singular tasks. For example, a user may provide the following query "I want to see the sales performance of our top 10 selling servers in Q1 of 2023, including details about their CPU and GPU configurations." In this example the user query may be decomposed into two tasks, (1) "retrieve sales data for the top 10 selling servers in Q1 of 2023" and (2) "retrieve detailed CPU and GPU configurations for these servers". In one or more embodiments, the query may only include one singular task. In one or more embodiments, decomposing the tasks enables the system to more accurately identify preexisting data assets for each singular task as described below in FIG. 5.

In step 404, a data asset is retrieved for the user query using a data asset reutilization engine (e.g., 108 in FIG. 1) as described below in FIG. 5. In one or more embodiments, the data asset reutilization engine (e.g., 108 in FIG. 1) may retrieve more than one data asset depending on how many tasks are decomposed from the user query in step 402. Further, In one or more embodiments, the data asset may be a pre-existing data asset or a newly retrieved data asset as described below in FIG. 5. Continuing with the example in step 402, user query task (1) may result in obtaining a data asset including recent server sales data from Q1 of 2023 and task (2) may result in obtaining a data asset including CPU and GPU configurations of the servers.

In step 406, the LLM agent (e.g., 102 in FIG. 1) determines whether any additional processing is needed on the data asset. In one or more embodiments, this determination may be based on what is requested in the user query. Continuing with the example in step 402, the user requested "sales performance of our top 10 selling servers in Q1 of 2023" and in step 404, the data asset reutilization engine (e.g., 108 in FIG. 1) retrieved a data asset including unsorted sever sales data from the last quarter, thus additional processing is needed to determine the top 10 selling servers in the last quarter. If, for example, the user only wanted the sales data for the last quarter, the data asset may be sufficient to satisfy the user query without additional processing. In one or more embodiments, the LLM agent (e.g., 102 in FIG. 1) may make this determination using any means known in the art. Accordingly, if the result of this determination is YES, the method proceeds to step 410. If the result of the determination is NO, the method proceeds to step 408.

In step 408, after determining that no additional processing is needed in step 406, the LLM agent (e.g., 102 in FIG. 1) generates a response to the user query using the data asset and an LLM (e.g., 104 in FIG. 1). In one or more embodiments, the response is in natural language text. In one or more embodiments, the response includes providing the data asset in a narrative form, providing additional natural language information alongside the data asset, or any combination thereof. The method then proceeds to step 414.

In step 410, after determining that additional processing is needed in step 406, the support agent (e.g., 106 in FIG. 1) performs the additional processing on the data asset to generate a processed data asset. In one or more embodiments, additional processing includes any operations that enhance, analyze, transform, filter, and interpret the data asset including but not limited to validation, aggregation, summarization, anomaly detection, pattern recognition, predicting, interpolation, sorting, natural language understanding, and optimization, etc. Continuing with the example in step 404 additional processing on the data asset from the user query requesting "sales performance of our top-selling servers in the last quarter" may include filtering and sorting the data asset to identify the top 10 selling servers in Q1 of 2023. In this example, the processed data asset may be a list of the top 10 selling servers in Q1 of 2023.

In step 412, the LLM agent (e.g., 102 in FIG. 1) generates a response to the user query using the processed data asset and the LLM (e.g., 104 in FIG. 1). In one or more embodiments, the response includes providing the data asset in a narrative form, providing additional natural language information alongside the data asset, or any combination thereof. In one or more embodiments, the response is a natural language text. The method then proceeds to step 414.

The process may arrive at step 414 via step 408 or 412. In step 414, the response is displayed to the user using the query device (e.g., 100 in FIG. 1). In one or more embodiments, the query device (e.g., 100 in FIG. 1) may display the response via a graphical user interface (GUI). In one or more embodiments, the method of FIG. 4 is iterative to enable a user to engage in a conversation.

In one or more embodiments, the method may end following step 414.

Figure 5:
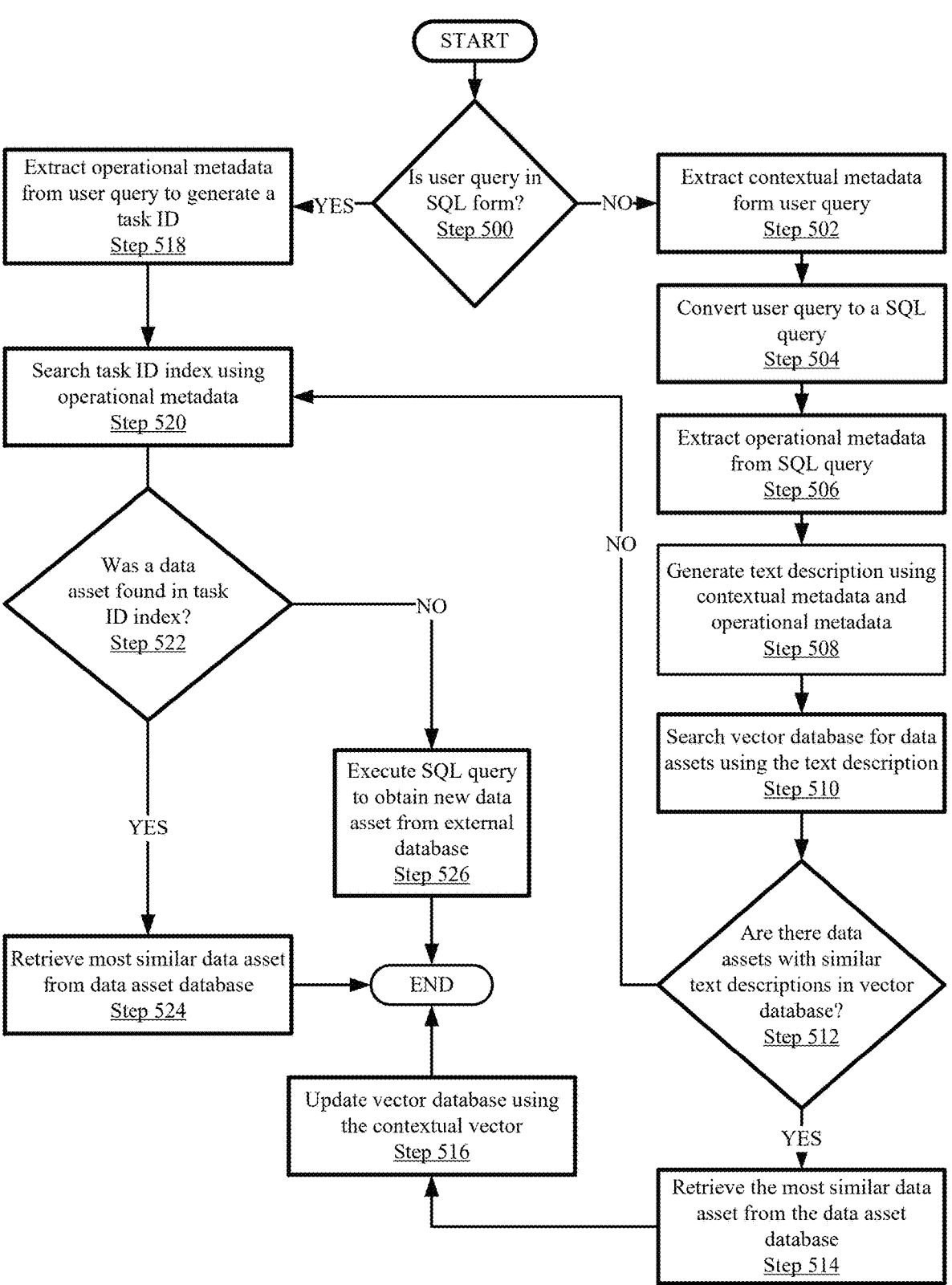
FIG. 5 shows a flowchart of a method for retrieving data assets using contextual and operational metadata from a user query in accordance with one or more embodiments of the disclosure.

Turning to FIG. 5, FIG. 5 shows a method for retrieving data assets using contextual and operational metadata from a user query in accordance with one or more embodiments of the disclosure disclosed herein. The method may be performed by, for example, an LLM agent (e.g., 102 in FIG. 1). Other components in the system may perform this method without departing from the disclosure.

While the various steps in the flowchart shown in FIG. 5 are presented and described sequentially, one of ordinary skill in the art in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 5 may be performed concurrently with one or more steps in FIGS. 3-4.

In step 500, the LLM agent (e.g., 102 in FIG. 1) determines whether a user query is in SQL form. In one or more embodiments, the LLM agent (e.g., 102 in FIG. 1) may make this determination by any means known in the art. In one or more embodiments, SQL form may include computer-readable code and the data source specified in the user query. In a non-limiting example a user query reciting "retrieve the sales data from Q 1 of 2023", is not in SQL form as it is in natural language text rather than computer-readable code and does not recite a data source. In one or more embodiments, the LLM agent (e.g., 102 in FIG. 1) may transform the user query into a JSON format before making this determination. Accordingly, if the result of this determination is YES, the method proceeds to step 518. If the result of the determination is NO, the method proceeds to step 502.

In step 502, a contextual metadata extractor (e.g., 208 in FIG. 2.1) extracts contextual metadata from the user query. In one or more embodiments, the contextual metadata includes creation descriptions and AI conversation logs. In one or more embodiments, the creation descriptions include natural language descriptions of the data asset provided at the time of the data asset's creation and/or retrieval (e.g., this data asset includes sales data for . . . ). In one or more embodiments, AI conversation logs include the natural language user request and natural language conversation between a human and an LLM agent (e.g., 102 in FIG. 1) used to obtain or create the data asset. In one or more embodiments, the AI conversation logs may only be available if the data asset was created or retrieved using an LLM. In one or more embodiments, the user query in this step may be in unstructured form (e.g., in natural language text).

In step 504, the user query is converted into an SQL query using a SQL query generator (e.g., 202 in FIG. 2.1). In one or more embodiments, the SQL query generator (e.g., 202 in FIG. 2.1) may convert the user query into SQL query form by any means known in the art. Continuing with the example from step 500, the unstructured user query reciting "I want to see sales performance from Q1 of 2023" may be converted into SQL form as follows:

```
SELECT *
FROM sales_data
WHERE sale_date >= '2023-01-01'
AND sale_date <= '2023-03-31';
```

In step 506, operational metadata is extracted from the SQL query by an operational metadata extractor (e.g., 204 in FIG. 2.1). In one or more embodiments, in this step, the user query may be in SQL form. In one or more embodiments, SQL form may include the user query in computer-readable code (e.g., SELECT*FROM "sales_data" . . . ) and the data source specified in the user query (e.g., FROM "sales_data"). In one or more embodiments, the operational metadata from the SQL query may include the computer-readable code and the data source. Further, the operational metadata extractor (e.g., 204 in FIG. 2.1) may also generate a task ID using the operational metadata in this step. In one or more embodiments, a task ID includes include any identifier or other notation methodology (e.g., a unique string of characters and/or cryptographic variables) to uniquely identify a larger set of data, such as the operational metadata associated with the data asset.

In step 508, the LLM agent (e.g., 102) generates a text description of the query using the contextual metadata and the operational metadata. In one or more embodiments, the query text description may be a natural language description describing the intent and context of the user query. Continuing with the example in steps 500 and 504, the text description of the user query may be "this query is requesting sales data for Q1 of 2023 from the SALES DATA database" In one or more embodiments, in most scenarios, the contextual metadata is sufficient to generate the query text description without using operational metadata. In one or more embodiments, the operational metadata may be needed to generate the query text description if the contextual metadata does not provide enough information.

In step 510, a contextual data analyzer (e.g., 210 in FIG. 2.1) searches a vector database (e.g., 224 in FIG. 2.2) for contextual vectors with text descriptions similar to the query text description. Continuing with the example in step 506, the vector database (e.g., 224 in FIG. 2.2) may include contextual vector 1 with a text description reciting "this data asset contains sales data from 2023, sourced from SALES DATA database" and contextual vector 2 with a text description reciting "this data asset contains sales data for the Q1 and Q2 of 2023, sourced from SALES DATA database" and contextual vector 3 with a text description reciting "this data asset contains sales data from Q4 of 2023, sourced from SALES DATA database."

In step 512, the contextual data analyzer (e.g., 210 in FIG. 2.1) determines whether there are any text descriptions in the vector database (e.g., 224 in FIG. 2.2) similar to the query text description. In one or more embodiments, the LLM agent (e.g., 102 in FIG. 1) may make the determination by any means known in the art including but not limited to generating and comparing similarities scores for each of the contextual vectors. Accordingly, if the result of this determination is YES, the method proceeds to step 514. If the result of the determination is NO, the method proceeds to step 520. Continuing with the example in step 510, the contextual data analyzer (e.g., 210 in FIG. 2.1) may make a determination that contextual vectors 1 and 2 are similar to the query text description in step 508.

In step 514, the data asset reutilization engine (e.g., 108 in FIG. 1) retrieves a data asset from a data asset database (e.g., 110 in FIG. 1) associated with the text description from the vector database (e.g., 224 in FIG. 2.2) that is most similar to the query text description. In one or more embodiments, the text descriptions in the vector database (e.g., 224 in FIG. 2.2) are each associated with data assets in the data asset database (e.g., 110 in FIG. 1). Continuing with the example in step 512, the data asset reutilization engine (e.g., 108 in FIG. 1) may determine that vector 2 is the most similar to the query text description 1 because it only includes data from Q1-Q2 while vector 1 includes data from all of 2043 and thus contains more irrelevant information. Thus, in this example, the data asset associated with contextual vector 2 is retrieved.

In step 516, the retrieved data asset's text description is updated by the contextual data analyzer (e.g., 210 in FIG. 2.1) using the query text description and stored in the vector database (e.g., 224 in FIG. 2.2). In one or more embodiment, the updated text description may be stored as a contextual vector.

In one or more embodiments, the method may end following step 516.

In step 518, operational metadata is extracted from the user query using the operational metadata extractor (e.g., 204 in FIG. 2.1) to generate a query task ID. In one or more embodiments, in this step, the user query may be in SQL form. In one or more embodiments, SQL form may include the user query in computer-readable code (e.g., SELECT*FROM sales_data) and the data source specified in the user query (e.g., FROM "sales_data"). In one or more embodiments, the operational metadata may include the computer-readable code and the data source from the SQL query. In one or more embodiments, the query task ID is a unique string of characters and/or cryptographic variables related to the operational metadata.

The process may arrive at step 520 via step 512 or 518. In step 520 a SQL analyzer (e.g., 206 in FIG. 2.1) searches a task ID index (e.g., 222 in FIG. 2.2) for task IDs similar to the query task ID.

In step 522, the SQL analyzer (e.g., 206 in FIG. 2.1) determines whether there are any task IDs in the task ID index (e.g., 222 in FIG. 2.2) similar to the query task ID. In one or more embodiments, the SQL analyzer (e.g., 206 in FIG. 2.1) may make the determination by any means known in the art. Accordingly, if the result of this determination is YES, the method proceeds to step 524. If the result of the determination is NO, the method proceeds to step 526.

In step 524, the data asset reutilization engine (e.g., 108 in FIG. 1) retrieves a data asset from a data asset database (e.g., 110 in FIG. 1) associated with the task ID from the task ID index (e.g., 222 in FIG. 2.2) that is most similar to the query task ID. In one or more embodiments, the task IDs in the task ID index (e.g., 222 in FIG. 2.2) are each associated with data assets in the data asset database (e.g., 110 in FIG. 1). In one ore more embodiments, the SQL analyzer (e.g., 206 in FIG. 2.1) may update the retrieved data asset's task ID using the query task ID in the task ID index (e.g., 222 in FIG. 2.2).

In one or more embodiments, the method may end following step 524.

In step 526, the LLM agent (e.g., 102 in FIG. 1) executes the SQL query to obtain and/or create a new data asset from an external database. In one or more embodiments, the LLM agent (e.g., 102 in FIG. 1) may obtain the new data asset by any means known in the art.

In one or more embodiments, the method may end following step 526.

Figure 6:
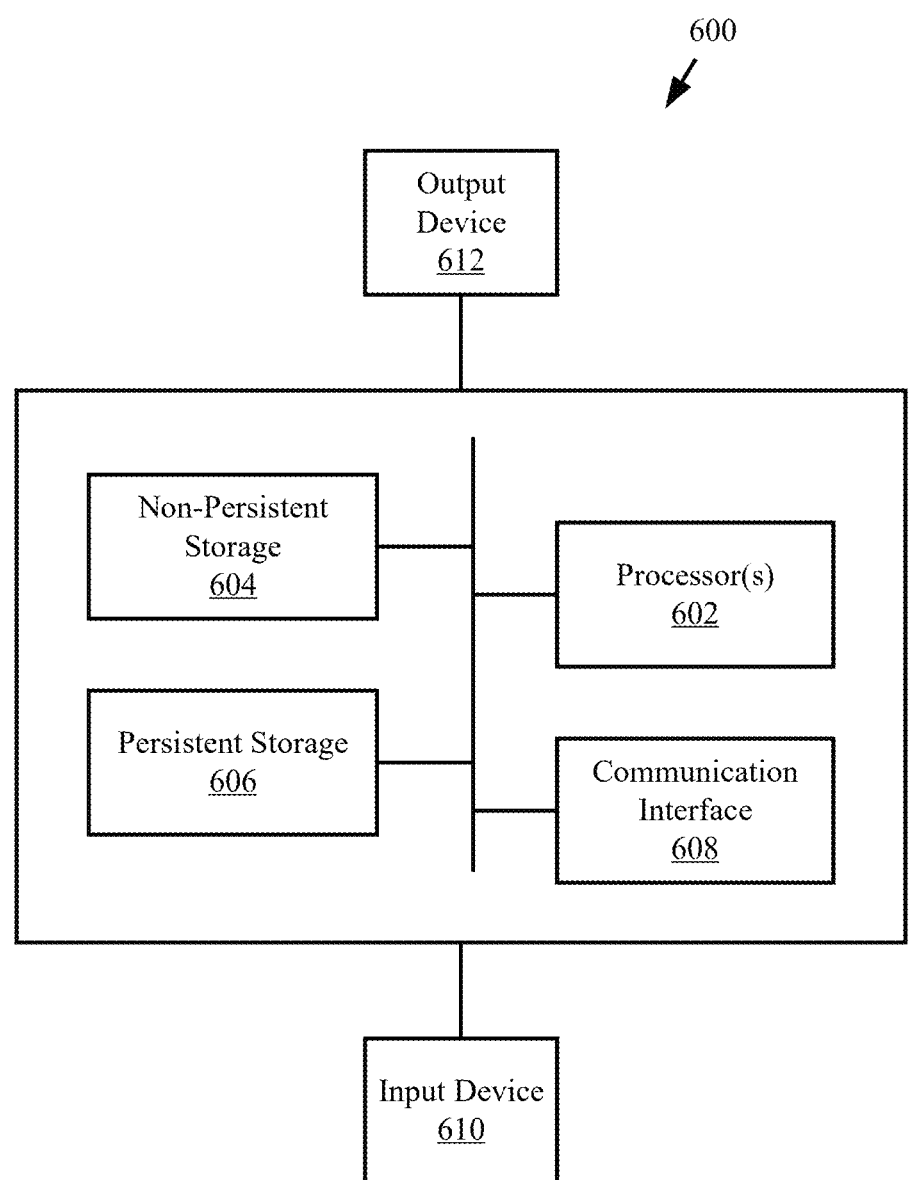
FIG. 6 shows a diagram of a computing system in accordance with one or more embodiments of the disclosure.

Embodiments of the disclosure may be implemented using computing devices. Turning to FIG. 6, FIG. 6 shows a diagram of a computing device (600) in accordance with one or more embodiments. The computing device (600) may include one or more computer processor(s) (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (608) (e.g., Bluetooth interface, infrared interface, network interface, optical interface, etc.), input devices (610), output devices (612), and numerous other elements (not shown) and functionalities. Each of these components is described below.

In one embodiment, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. The communication interface (608) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment, the computing device (600) may include one or more output devices (612), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (610, 612) may be locally or remotely connected to the computer processor(s) (602), non-persistent storage (604), and persistent storage (606). Many diverse types of computing devices exist, and the aforementioned input and output device(s) (610, 612) may take other forms.

In the following detailed description of the embodiments of the disclosure, numerous specific details are set forth in order to provide a more thorough understanding of one or more embodiments of the disclosure. However, it will be apparent to one of ordinary skill in the art in the art that the one or more embodiments of the disclosure may be practiced without these specific details. In other instances, well-known features have not been described in detail to avoid unnecessarily complicating the description.

In the prior description of the figures, any component described with regard to a figure, in various embodiments of the disclosure, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for generating a query response using a data asset reutilization engine, the method comprising:

receiving a first user query from a user via a client;

extracting contextual metadata from the first user query, wherein the contextual metadata includes creation descriptions and artificial intelligence (AI) conversation logs, and wherein the AI conversation logs include a natural language request and a natural language conversation between a second user and a large language model (LLM) agent used to obtain or create a first data asset;

embedding the contextual metadata as a first contextual vector;

making a first determination, using a vector database and the first contextual vector, that the first data asset matches the first user query;

obtaining, in response to the first determination, the first data asset;

generating a first response based on the first data asset; and causing to display the first response to the user.

2. The method of claim 1, wherein prior to generating the first response;

making a second determination that additional processing is needed on the first data asset; and performing additional processing on the first data asset to generate a processed data asset, wherein generating the first response is based on the processed data asset, and wherein the additional processing comprises at least one selected from one of the following: sorting the data asset, making predictions using the data asset, and finding trends using the data asset.

3. The method of claim 1, wherein the method further comprises:

making a second determination that the first user query is not in structured query language (SQL) form, wherein the embedding is in response to the second determination;

converting the first user query into SQL form to receive a SQL query; extracting operational metadata from the SQL query;

embedding, prior to the first determination, the operational metadata into the first contextual vector.

4. The method of claim 3, wherein the first determination is based upon a similarity score between the first data asset and the first contextual vector.

5. The method of claim 1, wherein the method further comprises updating the vector database using the first contextual vector to obtain an updated vector database.

6. The method of claim 5, further comprising:

receiving a second user query from the user via the client;

extracting second contextual metadata from the second user query;

embedding the second contextual metadata as a second contextual vector;

making a second determination, using the updated vector database and the second contextual vector, that a second data asset matches the second user query;

obtaining, in response to the second determination, the second data asset;

generating a second response based on the first data asset; and causing to display the second response to the user.

7. The method of claim 1, wherein prior to receiving the first user query:

obtaining at least one data asset;

extracting operational metadata from the at least one data asset;

assigning a task ID to the at least one data asset;

storing the task ID in a task ID index;

extracting contextual data from the at least one data asset;

embedding the contextual metadata and the operational metadata into a third contextual vector; and storing the third contextual vector in the vector database.

8. A non-transitory computer readable medium (CRM) comprising computer readable program code, which when executed by a computer processor, enables the computer to perform a method for generating a query response using a data asset reutilization engine, the method comprising:

receiving a first user query from a user via a client;

extracting contextual metadata from the first user query, wherein the contextual metadata includes creation descriptions and artificial intelligence (AI) conversation logs, and wherein the AI conversation logs include a natural language request and a natural language conversation between a second user and a large language model (LLM) agent used to obtain or create a first data asset;

embedding the contextual metadata as a first contextual vector;

making a first determination, using a vector database and the first contextual vector, that the first data asset matches the first user query;

obtaining, in response to the first determination, the first data asset;

generating a first response based on the first data asset; and causing to display the first response to the user.

9. The non-transitory CRM of claim 8, wherein prior to generating the first response;

making a second determination that additional processing is needed on the first data asset; and performing additional processing on the first data asset.

10. The non-transitory CRM of claim 8, wherein the method further comprises:

making a second determination that the first user query is not in structured query language (SQL) form, wherein the embedding is in response to the second determination;

converting the first user query into SQL form to receive a SQL query; and extracting operational metadata from the SQL query, wherein the operational metadata is embedded in the first contextual vector.

11. The non-transitory CRM of claim 10, wherein the first determination is based upon a similarity score between the first data asset and the contextual vector.

12. The non-transitory CRM of claim 8, wherein the method further comprises updating the vector database using the contextual vector to obtain an updated vector database.

13. The non-transitory CRM of claim 12, further comprising:

receiving a second user query from a user via a client;

extracting contextual metadata from the second user query;

embedding the contextual metadata as a second contextual vector;

making a second determination, using the updated vector database and the second contextual vector, that a second data asset matches the second user query;

obtaining, in response to the second determination, the second data asset;

generating a second response based on the first data asset; and causing to display the second response to the user.

14. The non-transitory CRM of claim 8, wherein prior to receiving the first user query:

obtaining at least one data asset;

extracting operational metadata from the at least one data asset;

assigning a task ID to the at least one data asset;

storing the task ID in a task ID index;

extracting contextual data from the at least one data asset;

embedding the contextual metadata and the operational metadata into a third contextual vector; and storing the third contextual vector in the vector database.

15. A system for generating a query response using a data asset reutilization engine, the system comprising:

a computing device programmed to:

receive a first user query from a user via a client;

extract contextual metadata from the first user query, wherein the contextual metadata includes creation descriptions and artificial intelligence (AI) conversation logs, and wherein the AI conversation logs include a natural language request and a natural language conversation between a second user and a large language model (LLM) agent used to obtain or create a first data asset;

embed the contextual metadata as a first contextual vector;

make a first determination, using a vector database and the first contextual vector, that a first data asset matches the first user query;

obtain, in response to the first determination, the first data asset;

generate a first response based on the first data asset; and cause to display the first response to the user.

16. The system of claim 15, wherein prior to generating the first response the computing device is further programmed to:

make a second determination that additional processing is needed on the first data asset; and perform additional processing on the first data asset.

17. The system of claim 15, wherein the computing device is further programmed to:

make a second determination that the first user query is not in structured query language (SQL) form, wherein the embedding is in response to the second determination;

convert the first user query into SQL form to receive a SQL query; and extract operational metadata from the SQL query, wherein the operational metadata is embedded in the first contextual vector.

18. The system of claim 15, wherein prior to receiving the first user query the computing device is further programmed to:

obtain at least one data asset;

extract operational metadata from the at least one data asset;

assign a task ID to the at least one data asset;

store the task ID in a task ID index;

extract contextual data from the at least one data asset;

embed the contextual metadata and the operational metadata into a third contextual vector; and store the third contextual vector in the vector database.

19. The system of claim 15, wherein the first user query comprises unstructured data.

* * * * *